United States Patent
Carvalho et al.

(10) Patent No.: US 10,511,359 B2
(45) Date of Patent: Dec. 17, 2019

(54) TRANSMISSION METHOD WITH DOUBLE DIRECTIVITY

(71) Applicants: Paulo Miguel Carvalho, Lisbon (PT); Marco Alexandre Gomes, Coimbra (PT); Rui Miguel Dinis, Costa da Caparica (PT); Vitor Manuel Silva, Coimbra (PT); Pedro Daniel Bento, Vllamar (PT)

(72) Inventors: Paulo Miguel Carvalho, Lisbon (PT); Marco Alexandre Gomes, Coimbra (PT); Rui Miguel Dinis, Costa da Caparica (PT); Vitor Manuel Silva, Coimbra (PT); Pedro Daniel Bento, Vllamar (PT)

(*) Notice: Subject to any disclaimer, the term of this patent is extended or adjusted under 35 U.S.C. 154(b) by 0 days.

(21) Appl. No.: 15/330,968

(22) Filed: Jan. 14, 2016

(65) Prior Publication Data
US 2018/0091195 A1   Mar. 29, 2018

(51) Int. Cl.
*H04B 7/0426* (2017.01)
*H04B 7/0456* (2017.01)
(Continued)

(52) U.S. Cl.
CPC ............ *H04B 7/043* (2013.01); *H04B 7/0434* (2013.01); *H04B 7/0469* (2013.01); *H04L 25/14* (2013.01); *H04L 27/18* (2013.01); *H04L 27/2636* (2013.01)

(58) Field of Classification Search
CPC .............................. H04B 7/043; H04B 7/0469
See application file for complete search history.

(56) References Cited

U.S. PATENT DOCUMENTS

| 7,272,408 B2 | 9/2007 | Dalal et al. |
| 2004/0202255 A1 | 10/2004 | Dallal |

(Continued)

OTHER PUBLICATIONS

Astucia et al. (Efficient Amplification and Detection of Multilevel SC-FDE Signals Based on BPSK Components, 2013 IEEE Military Communications Conference).*

(Continued)

*Primary Examiner* — Jeffrey M Rutkowski
*Assistant Examiner* — Chae S Lee

(57) ABSTRACT

A transmission method using a massive MIMO (Multiple-Input and Multiple-Output) scheme with an arrangement 108 of $N_m \times N_b$ antenna elements at the transmitter, arranged in $N_m$ sets of $N_b$ antenna elements or $N_b$ sets of $N_m$ antenna elements based on SC-FDE (Single-Carrier with Frequency Domain Equalization) schemes with large constellations that is compatible with low-cost, highly-efficient, nonlinear amplifiers 106, while allowing spatial multiplexing gains.
The transmission structure of this transmission method decomposes in 103 the modulated symbols from 102 associated to a given constellation as the sum of $N_m$ polar components that are modulated as $N_m$ BPSK (Binary Phase Shift Keying) signals. Each of these BPSK signals can be regarded as an OQPSK (Offset Quadrature Phase Shift Keying) signal in the serial format that is specially designed to have good tradeoffs between reduced envelope fluctuations and a compact spectrum.

6 Claims, 4 Drawing Sheets

(51) Int. Cl.
*H04L 25/14* (2006.01)
*H04L 27/26* (2006.01)
*H04L 27/18* (2006.01)

(56) References Cited

U.S. PATENT DOCUMENTS

2005/0032483 A1* 2/2005 Klomsdorf ............ H04B 1/0475
455/110
2013/0301454 A1 11/2013 Seol et al.
2015/0288437 A1* 10/2015 Raju .................... H04B 7/0486
375/219
2017/0279501 A1* 9/2017 Kim ..................... H04B 7/0413

OTHER PUBLICATIONS

Sundeep Rangan et al. (Millimeter-Wave Cellular Wireless Networks: Potentials and Challenges, Proceedings of the IEEE | vol. 102, No. 3, Mar. 2014).*
Paulo Montezuma et al. (Power Efficient Coded 18-OQAM Schemes over Nonlinear Transmitters, 34th IEEE Samoff Symposium, May 3-4, 2011, Princeton, NJ, USA).

* cited by examiner

TRANSMISSION METHOD WITH DOUBLE DIRECTIVITY

BACKGROUND OF THE INVENTION

Field of the Invention

The present invention relates to telecommunication systems. More particularly, the present invention relates to transmission methods which make use of architectures of the type massive MIMO (Multiple-Input Multiple-Output) based on SC-FDE (Single-Carrier with Frequency Domain Equalization) schemes with large constellations that is compatible with low-cost, highly-efficient, nonlinear amplifiers, while allowing spatial multiplexing gains.

Description of Related Art

It is well-known that mm-wave (millimeter wave) communications have high potential for future wireless broadband systems. However, there are important challenges that need to be overcome when implementing those systems, both at the hardware level and due to the hostile propagation conditions. This is specially important for spectrally efficient communications based on large constellations, since the power requirements are higher, as well as the amplification difficulties, specially for large, dense constellations.

The use of mm-wave bands is expected to be a key feature of 5G (Fifth Generation) systems, since the large bands available allow significant capacity gains [1, 2, 3]. Moreover, the small wavelengths mean small antennas, together with small separation between antenna elements, allowing the implementation of massive MIMO (Multiple-Input and Multiple-Output) schemes. However, there are important challenges associated to the implementation of mm-wave systems, namely the high free space losses and difficult propagation conditions (e.g., small diffraction effects, huge losses due to obstacles) and difficulties at the hardware level. This combined with the large bit rates, means that the power requirements are much more severe than with conventional, sub-6 GHz, communications. This is particularly important for systems that also require high spectral efficiencies (i.e., large constellations), which not only have higher power requirements but are also associated to signals with higher envelope fluctuations and higher PAPR (Peak-to-Average Power Ratio), which leads to lower amplification efficiency [4]. Therefore, efficient power amplification is critical for mm-wave communications.

Another problem associated to broadband mm-wave communications is the frequency selectivity of the channel, since the good reflection properties of most materials at these frequencies lead to rich multipath environments. It is well-known that SC-FDE (Single-Carrier with Frequency Domain Equalization) is suitable for broadband communications over severely time-dispersive channels and severe power constraints [4, 5]. Although the PAPR problem is less serious with SC-FDE than with OFDM (Orthogonal Frequency-Division Multiplexing) schemes, a quasi-linear power amplifier is still required. It is known that class D or E amplifiers can have very high amplification efficiencies, together with low-cost implementations. However, since these amplifiers are strongly nonlinear, they should only be employed for signals with constant or quasi-constant envelope. OQPSK-type (Offset Quadrature Phase Shift Keying) signals can be decomposed as the sum of several linear OQPSK components [6], allowing good tradeoffs between reduced envelope fluctuations and a compact spectrum, including as special cases GMSK (Gaussian Minimum Shift Keying) and other CPM (Continuous Phase Modulation) schemes [7]).

The transmission method disclosed in the present application uses SC-FDE schemes, combined with offset modulations with large constellations, for high spectral efficiency mm-wave communications. To allow highly efficient, strongly nonlinear power amplifiers, the variable envelope signals associated to large constellations are decomposed as the sum of several polar components [8], each one modulated as a serial OQPSK signal [9] with reduced envelope fluctuations that is amplified and transmitted by a separate antenna within a massive MIMO scheme.

In the method disclosed in the present application it is employed a massive MIMO scheme with $N_m \times N_b$ antenna elements at the transmitter, arranged in $N_m$ sets of $N_b$ antenna elements or $N_b$ sets of $N_m$ antenna elements. As with conventional beamforming schemes $N_b$ antenna elements are employed to define directive beams for spatial multiplexing purposes and/or interference management. However, the $N_m$ elements associated to each of the $N_b$ beamforming elements are employed to allow an efficient amplification of the signals associated to a large constellation, which is substantially different from conventional massive MIMO schemes.

In the method disclosed in the present application the data stream is split into $N_u$ sub-streams that will be transmitted in parallel thanks to the spatial multiplexing capabilities of the antenna arrays employed for beamforming purposes (typically $N_u < N_b$). The data bits associated to each of the $N_u$ sub-streams are mapped into a given constellation (e.g., a QAM (Quadrature Amplitude Modulation) constellation) characterized by the ordered set $\mathfrak{S} = \{s_0, s_1, \ldots, s_{M-1}\}$, where M is the number of constellation symbols, following the rule $$(\beta_n^{(\mu-1)}, \beta_n^{(\mu-2)}, \ldots, \beta_n^{(1)}, \beta_n^{(0)}) \mapsto s_n \in \mathfrak{S},$$

with $(\beta_n^{(\mu-1)}, \beta_n^{(\mu-2)}, \ldots, \beta_n^{(1)}, \beta_n^{(0)})$ denoting the binary representation of n with $\mu = \log_2(M)$ bits. The constellations symbols are mapped in $N_m$ polar components, that are the result of the decomposition of signal $s_n$ in M components given by $$s_n = g_0 + g_1 b_n^{(0)} + g_2 b_n^{(1)} + g_3 b_n^{(0)} b_n^{(1)} + g_4 b_n^{(1)} + (\ldots)$$

$$= \sum_{i=0}^{M-1} g_i \prod_{m=0}^{\mu-1} (b_n^{(m)})^{\gamma_{m,i}} = \sum_{i=0}^{M-1} g_i b_n^{eq(i)},$$

with $(\gamma_{\mu-1,i}, \gamma_{\mu-2,i}, \ldots, \gamma_{1,i}, \gamma_{0,i})$ denoting the binary representation of i, $b_n^{(m)} = (-1)^{\beta_n^{(m)}}$ denoting the polar representation of the bit $\beta_n^{(m)}$, $b_n^{eq(i)} = \Pi_{m=0}^{\mu-1} (b_n^{(m)})^{\gamma_{m,i}}$ denoting the $i^{th}$ polar component of $s_n$ and $N_m$ is the number of non-zero $g_i$ coefficients of the referred decomposition equation.

Next each of the $N_m$ polar components is modulated as a BPSK (Binary Phase Shift Keying) signal, being each of these $N_m$ BPSK signals a serial representation of an OQPSK signal [9]. The corresponding signals can them be separately amplified by $N_m$ nonlinear amplifiers before being transmitted by $N_m \times N_b$ antennas. Spatial multiplexing effects combined with beamforming gains are achieved since each of these $N_m$ signals will be transmitted by $N_b$ antenna elements, with appropriate phase shifts to provide directive beams.

In the method disclosed in the present application, combination losses are avoided, since the outputs of the $N_m$ amplifiers are combined at the channel. Also the antenna vertical sub-array associated to the $N_m$ antenna elements performs constellation shaping as seen by the receiver [10], and the $N_b$ antenna elements placed horizontally, with spacing lower than or equal to $\lambda/2$ (where $\lambda$ is the wavelength of the transmission frequency carrier), allow horizontal beams.

In [11] it is disclosed a method of transmitting data based on an M-QAM modulation with nonlinear amplification. The transmission technique proposed in this application follows a different approach because the transmitter employs $N_m$ antennas in parallel, one for each of the BPSK signals of the serial format in which the multilevel constellation is decomposed. Besides that, each one of $N_m$ BPSK signals is transmitted by a set of $N_b$ antenna elements to provide directive beams.

In [12] are disclosed antenna arrays aimed to achieve a directive radiation pattern diagram, since the signals transmitted by the different antennas are correlated. The transmission structure proposed in this application, although based on two-dimensional antenna arrays, only the horizontal arrays achieve a directive radiation pattern since the signals transmitted by the $N_m$ different vertical antennas are uncorrelated, contrarily to what happens in [12].

Although it uses a set of antennas, two kinds of directivity are introduced by the disclosed method in the present application. The first one is introduced by a constellation shaping as seen by the receiver achieved by the vertical arrangement of $N_m$ antennas through a dependency on the configuration of constellations points on the desired direction of transmission. By contrast to the cases described in [12], the radiated power is not modified to maximize the radiated power in a given direction. The second one is introduced by the set of $N_b$ antenna elements placed horizontally that assures a maximization of radiation pattern in the desired horizontal direction.

In the method disclosed in the present application, the signals are independent with uncorrelated bit streams in each set of $N_m$ vertical antennas. In this case there is no spatial factor associated to the radiation pattern but only constellation shaping, contrarily to what was proposed in [12]. In the present application the various constituent signals suffer phase rotations according to their position on the set of $N_m$ transmit antennas so that the constellation shape is only optimized in the desired direction.

The closest case consists on a transmission of $N_m$ signals in parallel, similarly to what happens in a MIMO system, but unlike the MIMO wherein each signal is associated to a well-defined signal now each signal belongs to one of sub-constellations in which the constellation is decomposed. Also, unlike the MIMO without precoding, where at the receiver each signal can be received and decoded separately, the receiver for the $u^{th}$ data sub-stream in proposed method needs to combine all $N_m$ received signals to generate the transmitted symbol and only after this operation may decode the transmitted bits.

Document [13] discloses a transmission method to increase the system's throughput. Contrarily to the method of the present disclosure there is no decomposition of the constellation into sub-constellations, neither constellation shaping together with horizontal beamforming. Moreover, the method of [13] uses a single antenna, since all signals after the multiplication by the spreading sequences are combined and transmitted by only one antenna.

In [14] there are disclosed methods for nonlinear encoding of 16-OQAM (Offset QAM) schemes, based on two nonlinear OQPSK signals specially designed to allow higher amplification efficiency due to its robustness against nonlinear distortions. The present transmission method applies to any constellation and do not have the format constrains associated to the pulse shapes and durations that affect the decomposition done in [14].

In [15] there are disclosed pragmatic FDE (Frequency Domain Equalization) receivers that have low complexity but allow excellent performance, even for large QAM constellations and highly non-uniform offset constellations. A more detailed study about the reason behind the poor performance of modulations equalized with conventional FDE schemes is also presented. The decomposition of the constellations of the present application is generic and is not restricted to the serial OQPSK format described in [14] and [15].

In [16] and [17] is disclosed a transmission technique where near constant-envelope multiuser precoding is employed with resort to a phase modulator, where independent data streams are directly modulated by a phase modulator. The method of the present disclosure must be not confused with the techniques of [16,17] neither with conventional beamforming where the signal emitted by each antenna has a large dynamic range. Thus, there is no decomposition of multilevel constellations into constant envelope sub-constellations, no beams are formed, and the signals emitted by each antenna are not formed by weighing of a symbol of a given constellation (e.g. M-QAM).

In [18] it is disclosed a transmission method that uses multiple and spatially separated antennas at both transmit and receive to offer spatial multiplexing and spatial diversity in the polarization domain by using a DP (Dual Polarized) antenna at both transmit and receive sides. DP is also applied in the transmission method described in [19] where orthogonal channels are assured through DP wave transmission, since vertically and horizontally polarized electromagnetic waves in many non-line-of-sight scenarios fade almost independently (with some degree of cross-coupling), and in line-of-sight scenarios the two transmitted orthogonal polarizations remain orthogonal through the channel. Contrarily to the transmission methods disclosed in [18], [19] and [20], the method disclosed in the present application do not needs dual polarization to achieve the orthogonality as well as the double directivity. None of the methods described in [18], [19] and [20] uses a decomposition of multilevel constellations into constant envelope sub-constellations, and the signals emitted by each antenna are not formed by weighing of a symbol of a given constellation (e.g. M-QAM). Furthermore, separation between users is achieved by two different kinds of directivities: one is the information directivity introduced by constellation shaping as seen by the receiver that depends on a specific angle of optimization and another is the directivity associated to the beamforming. Contrarily to the method described in [20], the separation between users is achieved not only by beamforming but also by changing the constellation shape according to an angle in which the constellation is optimized for each user. Therefore, even when the beams are close or interfere, separation between users is granted by the different constellation spatial arrangements assigned to the different users.

REFERENCES

[1] IEEE 802.11 Task Group AD, "PHY/MAC Complete Proposal Specification", IEEE 802.11-10/0433r2, May 2010.

[2] T. S. Rappaport, et al., "Millimeter Wave Mobile Communications for 5G Cellular: It Will Work!", Access, IEEE, vol. 1, no., pp. 335-349, 2013.

[3] S. Rangan, T. S. Rappaport and E. Erkip, "Millimeter-Wave Cellular Wireless Networks: Potentials and Challenges", Proceedings of the IEEE, vol. 102, no. 3, pp. 366-385, March 2014.

[4] D. Falconer, S. Ariyavisitakul, A. Benyamin-Seeyar and B. Eidson, "Frequency Domain Equalization for Single-Carrier Broadband Wireless Systems", *IEEE Comm. Mag.*, vol. 4, no. 4, pp. 58-66, April 2002.

[5] A. Gusmão, R. Dinis, J. Conceição and N. Esteves, "Comparison of Two Modulation Choices for Broadband Wireless Communications", *IEEE VTC'00* (Spring), vol. 2, May 2000.

[6] A. Gusmão, V. Gonçalves and N. Esteves, "A novel approach to modeling of OQPSK-type digital transmission over nonlinear radio channels", *IEEE Journal on Selected Areas in Communications*, vol. 15, no. 4, pp. 647-655, 1997.

[7] T. Aulin, N. Rydbeck and C.-E. W. Sundberg, "Continuous phase modulation—Part II: Partial Response Signaling", in IEEE Transactions on Communications, vol. 29, no. 3, 1981, pp. 210-225.

[8] R. Dinis, P. Montezuma, N. Souto, and J. Silva, "Iterative Frequency-Domain Equalization for General Constellations", 33rd IEEE Sarnoff Symposium 2010, Princeton, USA, April 2010.

[9] F. Amoroso and J. Kivett, "Simplified MSK Signalling Technique2, IEEE Trans. on Comm., Vol. 25, April 1977.

[10] P. Montezuma, R. Dinis and D. Marques, "Robust Frequency-Domain Receivers for A Transmission Technique with Directivity at the Constellation Level", *IEEE VTC'2014* (Fall), Vancouver, Canada, September 2014.

[11] V. Astucia, "Linear amplification with multiple nonlinear devices", Faculty of Science and Technology, New University of Lisbon.

[12] O. Bucci, et al, "Optimal synthesis of difference patterns subject to arbitrary sidelobe bounds by using arbitrary array antennas", IEE Proceedings: Microwaves, Antennas and Propagation, Vol 152, No. 3, pp. 129-137, Jun. 26, 2005.

[13] M. Atsushi, U. Mitsuru, M. Kenichi, and U. Toshiyuki, "Radio transmitter, radio receiver, and multilevel modulation communication system," European patent EP 1253759 (A1)—2002 Oct. 30.

[14] P. Montezuma, et al., "Power efficient coded 16-OQAM schemes over nonlinear transmitters", 34th IEEE Sarnoff Symposium, May 3, 2011.

[15] M. Luzio, et al., "Efficient Receivers for SC-FDE Modulations with offset", IEEE, Military Communications Conference 2012, MILCOM 2012.

[16] C. Studer and E. G. Larsson, "PAR-aware large-scale multi-user MIMO-OFDM downlink", IEEE J. Sel. Areas Commun., vol. 31, pp. 303-313, February 2013.

[17] S. K. Mohammed and E. G. Larsson, "Per-antenna constant envelope precoding for large multi-user MIMO systems", IEEE Trans. Commun., vol. 61, pp. 1059-1071, March 2013.

[18] H. Dalal and Y. Steinberg, "Millimetre wave (MMW) communication system and method using multiple receive and transmit antennas," U.S. Pat. No. 7,272,408 B2, Sep. 18, 2007.

[19] Y. Dalal, "Dual polarity coding system and method for a millimeter wave communication system," US patent 20040202255 A1, Oct. 14, 2004.

[20] J. Seol, T. Kim, J. Park, and J. Cho, "Communication method and apparatus using analog and digital hybrid beamforming," US patent 20130301454 A1, Nov. 14, 2013.

BRIEF SUMMARY OF THE INVENTION

The method presented herein implements a massive MIMO scheme with $N_m \times N_b$ antenna elements at the transmitter, arranged in $N_m$ sets of $N_b$ antenna elements or $N_b$ sets of $N_m$ antenna elements based on SC-FDE schemes with large constellations that is compatible with low-cost, highly-efficient, nonlinear amplifiers, while allowing spatial multiplexing gains.

Advantages: The embodiments disclosed herein allow the transmission of signals with constellation shaping as seen by the receiver in a desired direction and beamforming of the transmission associated to each user. Therefore two kinds of directivities are used, one that affects the constellation shape and another associated to the beamforming that affects the radiation pattern of the set of antennas. The method can be used in massive MIMO communications to reduce interference between users with secure communications at physical layer.

The present application describes a transmission method comprising the following steps:

The data stream is split into $N_u$ sub-streams that will be transmitted in parallel thanks to the spatial multiplexing capabilities of the antenna arrays employed for beamforming purposes (typically $N_u < N_b$);

The data bits associated to each of the $N_u$ sub-streams are mapped by the QAM modulator 102 into a given constellation (e.g., a QAM constellation) characterized by the ordered set $\mathfrak{S} = \{s_0, s_1, \ldots, s_{M-1}\}$, where M is the number of constellation symbols, following the rule $$(\beta_n^{(\mu-1)}, \beta_n^{(\mu-2)}, \ldots, \beta_n^{(1)}, \beta_n^{(0)}) \mapsto s_n \in \mathfrak{S},$$

with $(\beta_n^{(\mu-1)}, \beta_n^{(\mu-2)}, \ldots, \beta_n^{(1)}, \beta_n^{(0)})$ denoting the binary representation of n with $\mu = \log_2(M)$ bits;

In 103 the constellations symbols are mapped in $N_m$ polar components, that are the result of the decomposition of signal $s_n$ in M components given by $$s_n = g_0 + g_1 b_n^{(0)} + g_2 b_n^{(1)} + g_3 b_n^{(0)} b_n^{(1)} + g_4 b_n^{(2)} + (\ldots)$$

$$= \sum_{i=0}^{M-1} g_i \prod_{m=0}^{\mu-1} (b_n^{(m)})^{\gamma_{m,i}} = \sum_{i=0}^{M-1} g_i b_n^{eq(i)},$$

with $(\gamma_{\mu-1,i}, \gamma_{\mu-2,i} \ldots \gamma_{1,i}, \gamma_{0,i})$ denoting the binary representation of i, $b_n^{(m)} = (-1)^{\beta_n^{(m)}}$ denoting the polar representation of the bit $\beta_n^{(m)}$, $b_n^{eq(i)} = \prod_{m=0}^{\mu-1} (b_n^{(m)})^{\gamma_{is}}_{m,i}$ denoting the $i^{th}$ polar component of $s_n$ and $N_m$ is the number of non-zero $g_i$ coefficients of the referred decomposition equation.

Each of the $N_m$ polar components is modulated as a BPSK signals in 104, being each of these $N_m$ BPSK signals a serial representation of an OQPSK signal [9], specially designed to have good tradeoffs between reduced envelope fluctuations and compact spectrum (e.g., a GMSK signal);

The resulting signals are submitted to a phase shifter 105 and are amplified by a set 107 of $N_m$ nonlinear amplifiers 106, before being transmitted by sub-array 109 associated to the $N_m$ antenna elements that performs constellation shaping as seen by the receiver, where the $N_m$ antennas should be placed vertically, and as close as possible (ideally less than or equal to $\lambda/2$);

Each of these $N_m$ signals will be transmitted by $N_b$ antenna elements 110 that should be placed horizontally, with spacing less than or equal to $\lambda/2$, to allow horizontal beams;

In another embodiment, each of these $N_m$ signals can be transmitted by an arrangement 108 of $N_m \times N_b$ antenna elements, with appropriate phase shifts to provide vertical and horizontal directive beams.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF DRAWINGS

The various aspects of embodiments disclosed here, including features and advantages of the present invention outlined above are described more fully below in the detailed description in conjunction with the drawings where like reference numerals refer to like elements throughout, in which.

DETAILED DESCRIPTION OF THE INVENTION

The present application describes a transmission method using a multi-antenna transmitter combined with a frequency-domain receiver for broadband mm-wave systems based on large and dense constellations. This transmitter is compatible with efficient, low-cost, nonlinear amplifiers, while allowing spatial multiplexing gains. Referring to the figures, it will now be described technology using different embodiments of the same technology, which is not intended to limit the scope of protection of this application. The embodiments are composed by a method of sequential steps as described below.

The transmission method uses SC-FDE schemes, combined with offset modulations with large constellations, for high spectral efficiency mm-wave communications. To allow highly efficient, strongly nonlinear power amplifiers, the variable envelope signals associated to large constellations are decomposed as the sum of several polar components [8], each one modulated as a serial OQPSK signal [9] with reduced envelope fluctuations that is amplified and transmitted by a separate antenna within a massive MIMO scheme.

Figure 1:
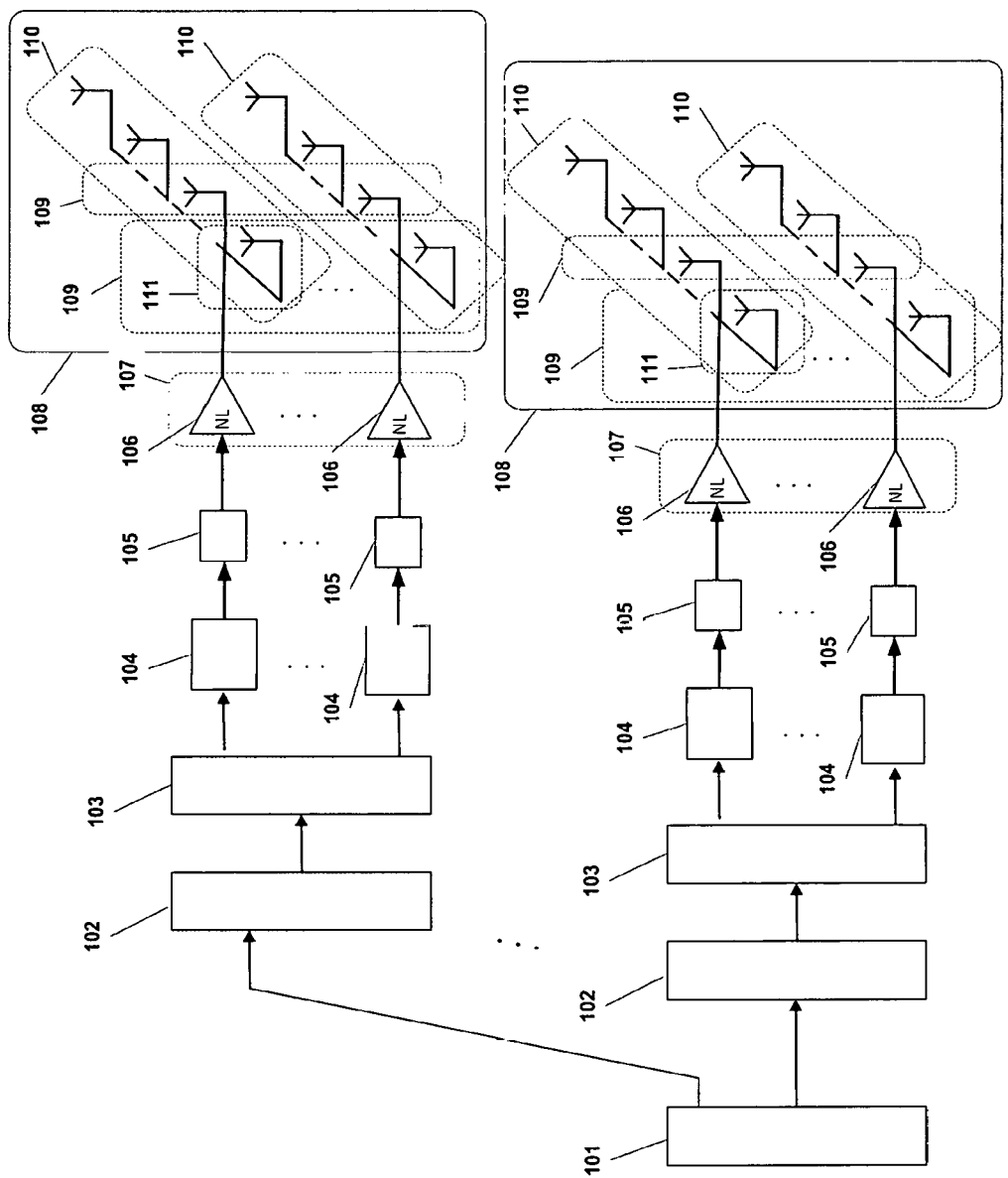
FIG. 1 shows a diagram of the transmitter's structure where the modulator 102, based on large dimension constellation (e.g., M-QAM), maps into symbols of a constellation the bits from the high bit rate data stream from 101. The resulting symbols are subsequently converted into $N_m$ antipodal sequences by the polar decomposition converter 103. These antipodal sequences are the inputs of BPSK modulators 104, whose outputs are continuous time BPSK signals, that are the phase shifter's input 105, and amplified by $N_m$ nonlinear amplifiers 106 before being transmitted by $N_m$ antennas placed vertically 109. Each of these $N_m$ signals will be transmitted by $N_b$ antenna elements placed horizontally 110, with appropriate phase shifts to provide directive beams. The arrays are composed by identical antennas 111.

The basic structure of the transmitter considered in this application is depicted in FIG. 1. In the present method, the signal associated to a given constellation is decomposed as the sum of $N_m$ polar components that are modulated as $N_m$ BPSK signals and it should be noted that each of these BPSK signals can be regarded as an OQPSK signal in the serial format that is specially designed to have good tradeoffs between reduced envelope fluctuations and a compact spectrum.

The method disclosed in the present application employs a massive MIMO scheme with $N_m \times N_b$ antenna elements at the transmitter represented by 108, arranged in $N_m$ sets of $N_b$ antenna elements or $N_b$ sets of $N_m$ antenna elements. As with conventional beamforming schemes $N_b$ antenna elements are employed to define directive beams for spatial multiplexing purposes and/or interference management. However, the $N_m$ elements associated to each of the $N_b$ beamforming elements are employed to allow an efficient amplification of the signals associated to a large constellation, which is substantially different from conventional massive MIMO schemes. The high rate data stream is split into $N_u$ sub-streams in 101 that will be transmitted in parallel thanks to the spatial multiplexing capabilities of the antenna arrays employed for beamforming purposes (typically $N_u < N_b$). The data bits associated to each of the $N_u$ sub-streams are mapped by a modulator 102 into a given constellation (e.g., a QAM constellation) characterized by the ordered set $\mathfrak{S} = \{s_0, s_1, \ldots, s_{M-1}\}$, where M is the number of constellation symbols, following the rule $$(\beta_n^{(\mu-1)}, \beta_n^{(\mu-2)}, \ldots, \beta_n^{(1)}, \beta_n^{(0)}) \mapsto s_n \in \mathfrak{S},$$

with $(\beta_n^{(\mu-1)}, \beta_n^{(\mu-2)}, \ldots, \beta_n^{(1)}, \beta_n^{(0)})$ denoting the binary representation of n with $\mu = \log_2(M)$ bits. In the polar decomposition block 103, the constellations symbols are mapped in $N_m$ polar components, that are the result of the decomposition of signal $s_n$ in M components given by $$s_n = g_0 + g_1 b_n^{(0)} + g_2 b_n^{(1)} + g_3 b_n^{(0)} b_n^{(1)} + g_4 b_n^{(2)} + (\ldots)$$

$$= \sum_{i=0}^{M-1} g_i \prod_{m=0}^{\mu-1} (b_n^{(m)})^{\gamma_{m,i}} = \sum_{i=0}^{M-1} g_i b_n^{eq(i)},$$

with $(\gamma_{\mu-1,i}, \gamma_{\mu-2,i} \cdots \gamma_{1,i}, \gamma_{0,i})$ denoting the binary representation of i, $b_n^{(m)} = (-1)^{\beta_n^{(m)}}$ denoting the polar representation of the bit $\beta_n^{(m)}$, $b_n^{eq(i)} = \prod_{m=0}^{\mu-1} (b_n^{(m)})^{\gamma_{m,i}}$ denoting the $i^{th}$ polar component of $s_n$ and $N_m$ is the number of non-zero $g_i$ coefficients of the referred decomposition equation.

Next each of the $N_m$ polar components is modulated as a BPSK signal in a modulator 104, whose output is a time continuous BPSK signal. To allow high spectral efficiency as well as the use of power-efficient, nonlinear amplifiers, each of these $N_m$ BPSK signals will be a serial representation of an OQPSK signal [9], specially designed to have good tradeoffs between reduced envelope fluctuations and compact spectrum (e.g., a GMSK signal). The corresponding signals can them be amplified by a set 107 of $N_m$ efficient, low-cost, nonlinear amplifiers 106 before being transmitted by an arrangement 108 of $N_m \times N_b$ identical antennas 111. To allow spatial multiplexing effects combined with beamforming gains, each of these $N_m$ signals will be transmitted by $N_b$ antenna elements 110, with appropriate phase shifts to provide directive beams, while each vertical sub-array 109 of $N_m$ antennas performs constellation shaping as seen by the receiver, accordingly the combination of polar components expressed by $$s_n = g_0 + g_1 b_n^{(0)} + g_2 b_n^{(1)} + g_3 b_n^{(0)} b_n^{(1)} + g_4 b_n^{(2)} + (\ldots)$$
$$= \sum_{i=0}^{M-1} g_i \prod_{m=0}^{\mu-1} (b_n^{(m)})^{\gamma_{m,i}} = \sum_{i=0}^{M-1} g_i b_n^{eq(i)},$$

For this, in each one of the $N_m$ branches, the signal obtained at the output of BPSK modulator 104 suffers a phase rotation in the phase shifter 105 and is amplified by the nonlinear amplifier 106. Thus, in each branch, the signal at the BPSK modulator's output is multiplied by a complex coefficient in the phase shifter 105 and then amplified by a nonlinear amplifier 106, which can operate in saturated mode or closed to it. This signal is sent to the corresponding horizontal set 110 of transmission antennas, that in the limit can be composed by only one antenna if beamforming is not used.

The amplification stage 107 is composed by $N_m$ amplifiers 106 in parallel with each amplifier connected to an antenna sub-array 110 with $N_b$ antennas arranged horizontally. The transmission structure is then composed by a set of $N_m$ nonlinear amplifiers and $N_m$ sets of $N_b$ antenna elements or $N_b$ sets of $N_m$ antenna elements. As with conventional beamforming schemes $N_b$ antenna elements are employed to define directive beams for spatial multiplexing purposes and/or interference management. It should be mentioned that there are no combination losses, since the outputs of the $N_m$ amplifiers are combined at the channel. Since the antenna sub-array 109 associated to the $N_m$ antenna elements performs constellation shaping as seen by the receiver [1], the $N_m$ elements of 109 should be placed vertically, and as close as possible (ideally less than $\lambda/2$). On the other hand, the $N_b$ antenna elements of 110 should be placed horizontally, with spacing $\lambda/2$, to allow horizontal beams, where they are mostly needed.

Figure 2:
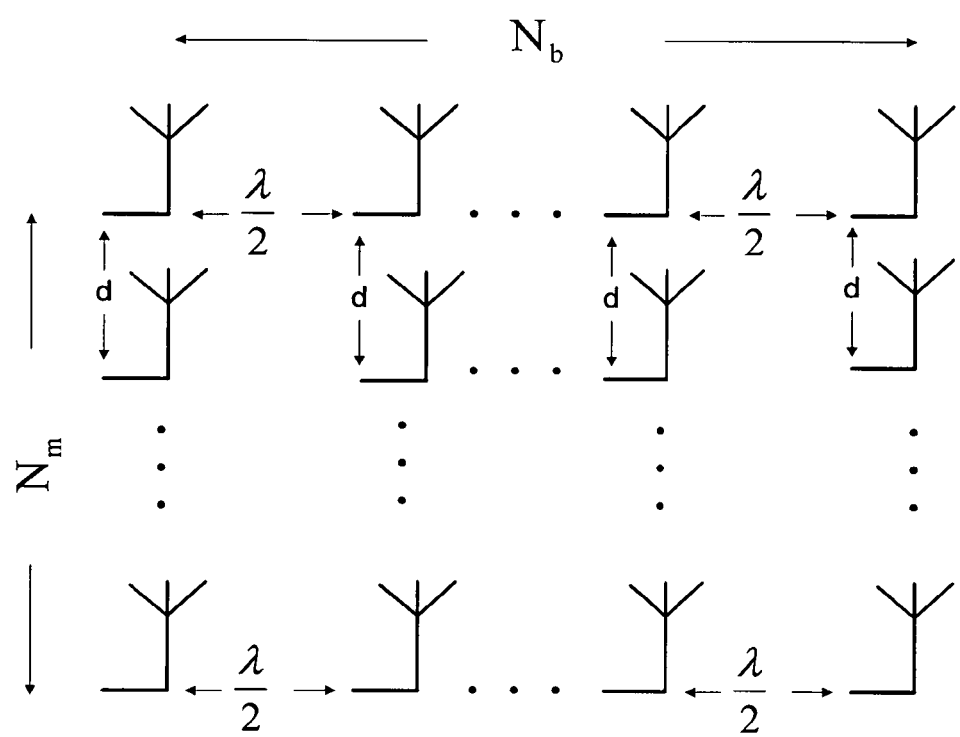
FIG. 2 illustrates a detailed diagram of the arrangement of the antenna array 108 from FIG. 1 where $N_m$ antennas are placed vertically with a separation distance d from each other and $N_b$ antenna elements placed horizontally with spacing $\lambda/2$.
Figure 3:
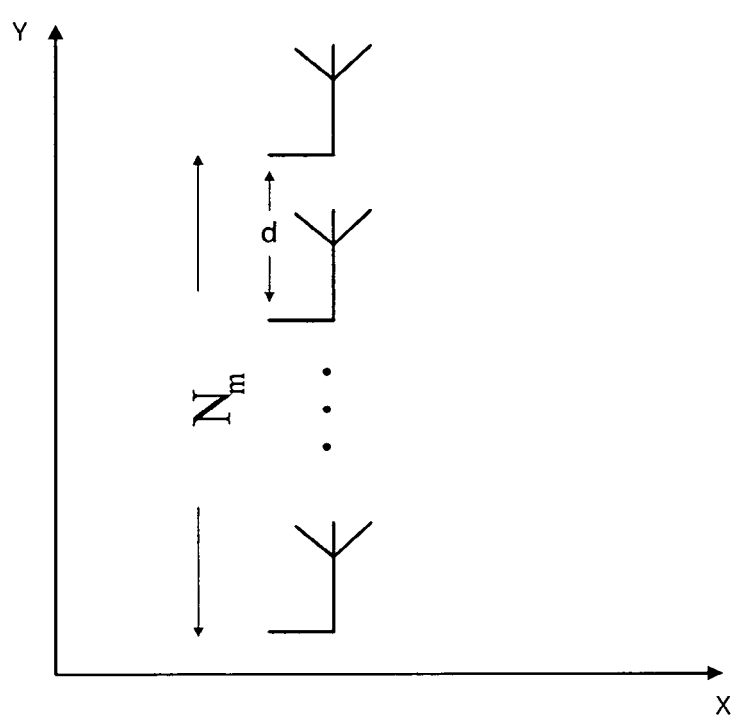
FIG. 3 illustrates a detailed diagram of the vertical arrangement 109 of a set of $N_m$ antennas that provides constellation shaping as seen by the receiver.

All antennas are equal, i.e. they have same radiation pattern. The $N_m$ antennas of the transmitter of FIG. 1 may be equally spaced vertically, being positioned along a line as illustrated in the linear array shown in FIG. 3. The set of $N_m \times N_b$ in a planar array the transmit antennas are positioned with different spacing for the two dimensions as shown for the case of the planar spatial arrangement depicted in FIG. 2.

Figure 4:
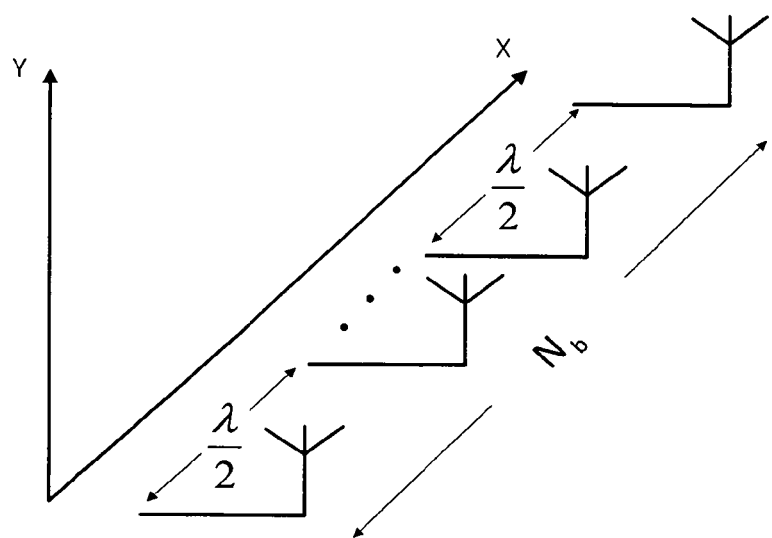
FIG. 4 illustrates a detailed diagram of the horizontal arrangement 110 of a set of $N_b$ antennas.

Since the BPSK components signals in the several amplifiers and antennas are uncorrelated, the resulting radiation diagram of the vertical sub-array with $N_m$ elements remains omnidirectional in the broad sense. Changes of the diagram due the superposition of the radiation patterns of the various antennas are introduced by each set of $N_b$ antenna elements with the spatial arrangement of FIG. 4. In this case, the excitation of the antennas aims a steering diagram as in the classical approach, being the directivity introduced at the radiated power.

Even though embodiments of the various aspects have been described, many different alterations, modifications and the like thereof will become apparent for those skilled in the art. The described embodiments are thereof not intended to limit the scope of the present disclosure.

What is claimed is:

1. Transmission method with double directivity comprising the following steps:
   a. the data stream is split into $N_u$ sub-streams in (101);
   b. the data bits associated to each of the $N_u$ sub-streams are mapped by a modulator (102) into a symbol sequence of a given constellation (the constellation can be a M-QAM, M-PSK or Voronoi constellation) characterized by the ordered set $\mathfrak{S} = \{S_0, S_1, \ldots, S_{M-1}\}$, where M is the number of constellation symbols, following the rule $$(\beta_n^{(\mu-1)}, \beta_n^{(\mu-2)}, \ldots, \beta_n^{(1)}, \beta_n^{(0)}) \mapsto s_n \in \mathfrak{S},$$

with $(\beta_n^{(\mu-1)}, \beta_n^{(\mu-2)}, \ldots, \beta_n^{(1)}, \beta_n^{(0)})$ denoting the binary representation of n with $\mu = \log_2(M)$ bits;
   c. the polar mapper (103) decomposes the constellations symbols in $N_m$ polar components, that are the result of the decomposition of signal $s_n$ into M components given by $$s_n = g_0 + g_1 b_n^{(0)} + g_2 b_n^{(1)} + g_3 b_n^{(0)} b_n^{(1)} + g_4 b_n^{(2)} + (\ldots)$$
   $$= \sum_{i=0}^{M-1} g_i \prod_{m=0}^{\mu-1} (b_n^{(m)})^{\gamma_{m,i}} = \sum_{i=0}^{M-1} g_i b_n^{eq(i)},$$

with $(\gamma_{\mu-1,i}, \gamma_{\mu-2,i}, \ldots, \gamma_{1,i}, \gamma_{0,i})$ denoting the binary representation of i, $b_n^{(m)} = (-1)^{\beta_n^{(m)}}$ denoting the polar representation of the bit $\beta_n^{(m)}$, $b_n^{eq(i)} = \prod_{m=0}^{\mu-1} (b_n^{(m)})^{\gamma_{m,i}}$ denoting the $i^{th}$ polar component of $s_n$ and $N_m$ is the number of non-zero $g_i$ coefficients of the referred decomposition equation;
   d. each of the $N_m$ polar components is modulated as a BPSK signal in (104), whose output is a time continuous BPSK signal, being each of these $N_m$ BPSK signal a serial representation of an OQPSK signal or a GMSK signal;
   e. each of $N_m$ resulting signals Is submitted to a phase shifter (105) and it is amplified by a nonlinear amplifier (106);
   f. the $N_m$ signals associated to each sub-stream are transmitted by an arrangement (108) of $N_m \times N_b$ antennas, arranged in $N_m$ sets of $N_b$ antenna elements or $N_b$ sets of $N_m$ antenna elements;
   g. each arrangement (108) is composed by one or more sets of $N_m$ antennas (109);
   h. each arrangement (108) is composed by one or more sets of $N_b$ antennas (110), to allow horizontal beams.

2. Transmission method with double directivity according to claim 1, in which the transmitter uses a massive MIMO (multiple input multiple output) scheme, with the antenna array composed by $N_u \times N_m \times N_b$ elements, arranged in $N_u$ sub-arrays, each one composed by $N_m$ sets of $N_b$ antenna elements or $N_b$ sets of $N_m$ antenna elements.

3. Transmission method with double directivity according to claim 1, in which the spacing between the $N_m$ sets of $N_b$ antennas performs constellation shaping of the transmitted constellation.

4. Transmission method with double directivity according to claim 1, in which the $N_m$ signals associated to each one of the $N_u$ sub-streams are combined in the transmission channel.

5. Transmission method with double directivity as in any one of claims 1 and 2, in which each set (108) of $N_m \times N_b$ antennas associated to the information stream for a user performs beamforming and several sets of $N_m \times N_b$ antennas (108) in parallel implement;
   a. spatial multiplexing;
   b. antenna's interference management;
   c. spatial multiplexing combined with antenna's interference management.

6. Transmission method with double directivity according to claim 1, in which two kinds of directivities are implemented, one that affects the constellation shape of the transmitted constellation and another associated to the beamforming that affects the radiation pattern of the set of antennas.

* * * * *